UNITED STATES PATENT OFFICE 2,036,952

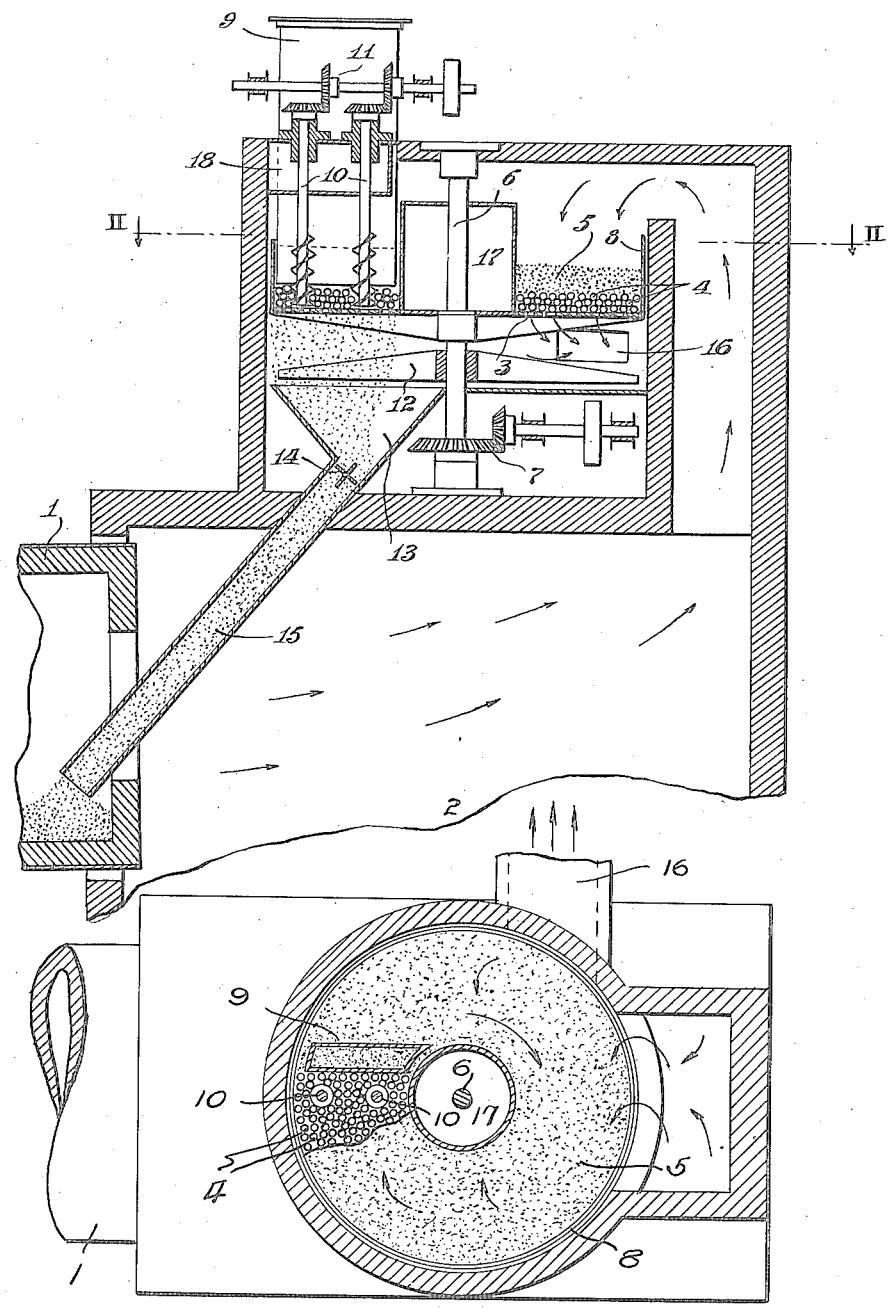

APPARATUS FOR THE TREATMENT OF CEMENT RAW MATERIALS

Kristian Middelboe, Frederiksberg, near Copenhagen, Denmark, assignor to F. L. Smidth & Co., New York, N. Y., a corporation of New Jersey Application March 31, 1934, Serial No. 718,320
In Great Britain April 8, 1933

5 Claims. (Cl. 263—33)

This invention relates to apparatus for the treatment of cement raw materials preliminary to the calcining and sintering of the same in the production of hydraulic cement by the dry process and in accordance with the invention a layer of the dry raw material in the form of pieces or nodules is subjected to the action of the waste gases from a rotary kiln, being thus preheated and, if desired, calcined.

Among preheaters hitherto used are chain grate preheaters and similar preheaters, acting as conveying means for the material. However, such preheaters call for considerable space, and a chain grate, for instance, has a bare chain part which cannot be covered with material, the grate area is badly utilized and this arrangement is, consequently, expensive. Moreover, these preheaters, as a rule, necessitate special arrangements for preventing the heated material from caking on the grate, or for removing such caking, if it occurs.

The present invention has for its object to overcome these drawbacks and difficulties, and according to the invention a layer of loose heat resistant bodies is arranged on a substantially horizontal gas-permeable support, and the nodules are supplied to form a layer on top of such layer of loose bodies in order that they may be acted on by the hot gases from the kiln which pass through the gas permeable support and the layer of loose bodies. After being acted on by the hot gases while the bodies and nodules are relatively at rest with respect one to another both layers are stirred without being intermingled so as to set the loose bodies and the nodules into relative motion and thus to cause the dried and heated nodules of the upper layer to pass without disintegration through the layer of loose bodies and the openings in the gas-permeable support. The loose bodies protect the gas-permeable support against adhesion of material, and any caking of material on the surface of the loose bodies formed during the heat treatment will be broken up by the stirring. The relative motion of the loose bodies will accelerate the passage of the dried and heated nodules down through the openings in the support.

The loose bodies may consist of iron, fireproof metal alloys, chamotte, porcelain, and the like, and may have the form of balls, or other suitable form, such as cubes, tetrahedrons, or other regular polygonal bodies, cylinders and the like.

The invention will be more fully explained hereinafter with reference to the accompanying drawings, in which it is illustrated, and in which:

Fig. 1 is a view in sectional elevation, partly diagrammatic, of one form of apparatus in which the invention may be embodied, a portion of the upper feed end of a rotary kiln being also shown, the gas-permeable support being in this instance moved about a vertical axis.

Fig. 2 is a view in horizontal section on the plane indicated by the line 2—2 of Fig. 1.

Figure 3:
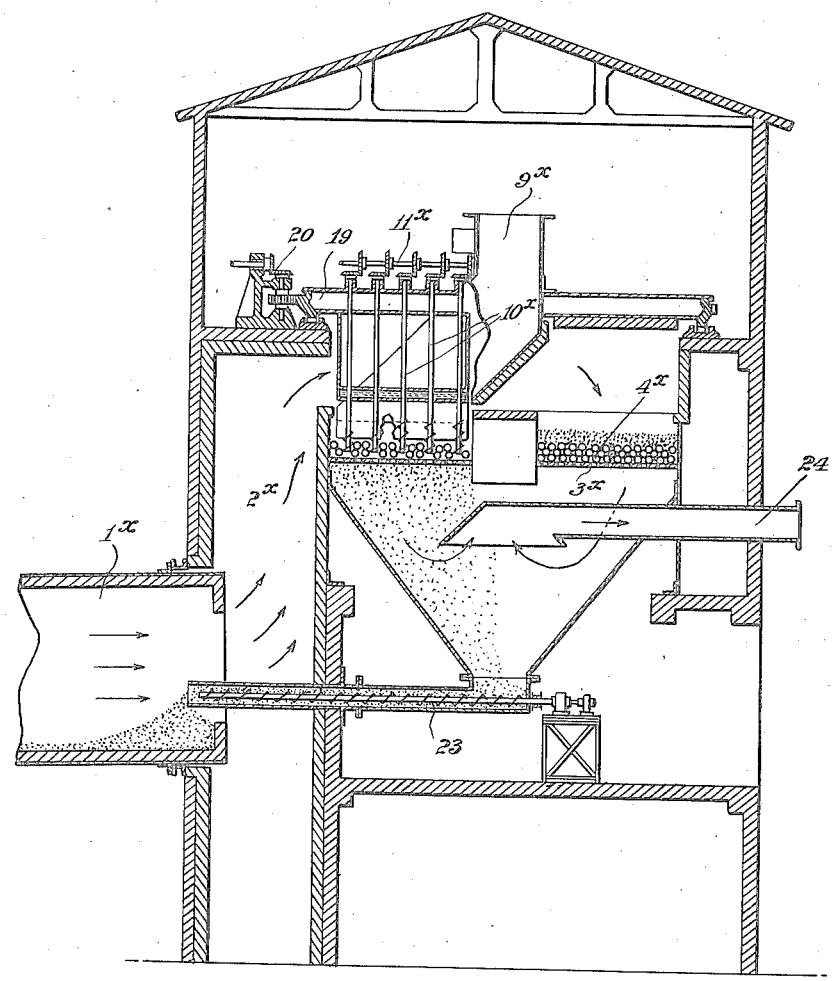
Fig. 3 is a view in sectional elevation of another form of apparatus in which the invention may be embodied, the gas-permeable support in this instance being stationary.

Fig. 1 shows the upper part 1 of a rotary kiln, and in conjunction with the smoke chamber 2 of this kiln is arranged a device for heating the material to be submitted to a further treatment in the rotary kiln, the waste gases from the rotary kiln, as indicated by the arrows, being led from above downward through a gas-permeable support 3 which forms the substantially horizontal bottom of a receptacle mounted on a vertical axis and carries a layer of loose heat resistant bodies 4, upon which is deposited a layer of the raw material to be preheated and subsequently sintered in the kiln. The gas-permeable support 3 is secured to a vertical rotating shaft 6 which is actuated by suitable means such as that indicated at 7. The layer of loose bodies and the layer 5 of nodules is surrounded by a wall 8, the material to be heated being introduced and deposited on the layer 4 through a chute 9. When the material introduced in this way, resting on the rotating support, has been carried through almost one rotation of the receptacle formed by the bottom 3 and the wall 8 and during this time has been submitted to a heating by the penetrating kiln gases, rotating stirrers 10 actuated by driving means 11 will set the loose bodies of the layer 4 as well as the elements of the layer 5 of material in relative motion and cause the thus preheated material to pass through the interstices of the layer 4 and the openings in the support 3 into the chamber below and upon the floor 12 where scrapers 12ᵃ deliver it to a hopper 13, whence it is discharged through a chute 15, provided with an air check, such as a bucket wheel 14, into the rotary kiln 1. The hot gases from the kiln are led through the smoke chamber and through a conduit 2ᵃ to the chamber above the support 3 with its layers 4 and 5 and thence downward through the layers and so to the opening 16 under the influence of the stack draft or exhaust fan. The support 3 is thus protected by the layers 4, 5 from impact of the hot gases. The exit gases leave the preheater through an opening 16. Rotating stirrers 10 consisting of vertical shafts with stirring arms, such as helical blades, project into the layers of material and loose bodies and effect relative movement of the elements of each of the two layers without causing substantial intermingling of the elements of the two layers and without subjecting the nodules to material disintegration. The rotating constructional parts, which would otherwise be exposed to the destructive action of the hot gases may be protected by surrounding mantles, as at 17, 18.

Fig. 3 shows a form of construction in which, unlike the apparatus above described, the gas-permeable support $3^\times$ for the loose bodies is stationary, while the means for stirring and feeding of the material are arranged to revolve about the vertical axis of the apparatus. The stirrers $10^\times$ are shown as mounted on a rotating supporting structure 19 designed as a turntable actuated by a driving means 20. On the same rotating structure is mounted a feed-pipe $9^\times$ for the material, the feed-pipe being formed as an elbow with the vertical part arranged coaxially with the axis of rotation. The dried and preheated material, which passes through the layer $4^\times$ and the support $3^\times$ is received in a hopper $13^\times$ from which it is fed into the rotary kiln $1^\times$ by a worm conveyor 23. The hot kiln gases are caused as before to pass downward through the layer of material and the support, which is thus protected from the impact of the hot gases.

It will be observed that in both embodiments of the invention the loose bodies and the nodules thereon are relatively at rest during the greater part of the heat treatment and except only when they are subjected to the action of the stirrers.

In another pending application of the same inventor Ser. No. 711,326 there is shown and described an apparatus of somewhat similar character which is designed, however, for the treatment of slurry in the production of cement by the wet process.

I claim as my invention:

1. Apparatus for the preheating of dry cement raw material comprising a receptacle mounted on a vertical axis and having a substantially horizontal gas-permeable bottom, a layer of loose, independent, heat resistant bodies on the bottom, the same being relatively at rest except when subjected to the action of the hereinafter mentioned means to produce movement, means to place on the layer of loose bodies a layer of cement raw material, means to direct hot gases from above downward through the layers of loose bodies and raw material and the gas-permeable bottom, and means to produce relative movement of a portion of the loose bodies of the first layer and relative movement of a portion of the elements of the second layer.

2. Apparatus for the preheating of dry cement raw material comprising a receptacle having a gas-permeable bottom, a layer of loose, independent, heat resistant bodies on the bottom, means to place on the layer of loose bodies a layer of cement raw material, means to direct hot gases from above downward through the layers of loose bodies and raw material and the gas-permeable bottom, and rotating stirrers entering the layers and acting to effect relative movement of the elements of each layer.

3. Apparatus for the preheating of dry cement raw material comprising a substantially horizontal receptacle having a gas-permeable bottom, a layer of loose, independent, heat resistant bodies on the bottom, means to place on the layer of loose bodies a layer of cement raw material, means to direct hot gases from above downward through the layers of loose bodies and raw material and the gas-permeable bottom, and rotating stirrers entering the layers and acting to effect relative movement of the elements of each layer.

4. Apparatus for the preheating of dry cement raw material comprising a substantially horizontal receptacle having a gas-permeable bottom, a layer of loose, independent, heat resistant bodies on the bottom, means to place on the loose bodies a layer of cement raw material, means to direct hot gases through the layers of loose bodies and raw material and the gas-permeable bottom, stirrers entering the layers and acting to effect relative movement of the elements of each layer, and means to rotate the receptacle.

5. Apparatus for the preheating of dry cement raw material comprising a substantially horizontal receptacle having a gas-permeable bottom, a layer of loose, independent, heat resistant bodies on the bottom, means to place on the loose bodies a layer of cement raw material, means to direct hot gases through the layers of loose bodies and raw material and the gas-permeable bottom, stirrers entering the layer and acting to effect relative movement of the elements of each layer, means to actuate the stirrers to effect relative movement of the elements of each layer, and means to cause the stirrers to move bodily with respect to the receptacle.

KRISTIAN MIDDELBOE.